United States Patent
Le Roux (10) Patent No.: US 12,402,207 B2
(45) Date of Patent: Aug. 26, 2025

(54) METHOD FOR MANAGING A CONTROLLER FUNCTION BY AN ITEM OF EQUIPMENT IN A BACKHAUL NETWORK

(71) Applicant: SAGEMCOM BROADBAND SAS, Rueil Malmaison (FR)

(72) Inventor: Sylvain Le Roux, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 315 days.

(21) Appl. No.: 17/884,140

(22) Filed: Aug. 9, 2022

(65) Prior Publication Data
US 2023/0058260 A1 Feb. 23, 2023

(30) Foreign Application Priority Data
Aug. 23, 2021 (FR) ...................... 2108832

(51) Int. Cl.
*H04W 84/12* (2009.01)
*H04L 9/40* (2022.01)

(52) U.S. Cl.
CPC ......... *H04W 84/12* (2013.01); *H04L 63/1416* (2013.01)

(58) Field of Classification Search
CPC . H04W 84/12; H04W 41/0813; H04W 41/12; H04W 36/38; H04W 36/08; H04W 88/08; H04L 63/1416; H04L 41/044
See application file for complete search history.

(56) References Cited

U.S. PATENT DOCUMENTS

| | | | | |
|---|---|---|---|---|
| 2011/0202293 | A1* | 8/2011 | Kobraei | G06Q 10/06 702/183 |
| 2017/0206529 | A1* | 7/2017 | Raleigh | G06Q 40/03 |
| 2020/0403911 | A1* | 12/2020 | Singhal | H04L 45/34 |
| 2021/0072897 | A1* | 3/2021 | Ishihara | G06F 3/0658 |
| 2021/0211959 | A1* | 7/2021 | Nakagawa | H04W 36/10 |
| 2025/0008328 | A1* | 1/2025 | Smith | H04L 63/065 |
| 2025/0022281 | A1* | 1/2025 | Feldmaier | H04N 23/633 |

FOREIGN PATENT DOCUMENTS

EP    3 267 623 A2    1/2018

\* cited by examiner

*Primary Examiner* — Mewale A Ambaye
(74) *Attorney, Agent, or Firm* — Williams Mullen; R. Brian Drozd (57) ABSTRACT

A method provided manages a controller function of investigator equipment belonging to a backhaul network, which includes a plurality of items of equipment managing a unified wireless network. Each item of equipment the controller function of which is active fulfils a role of controller. The investigator equipment can activate and deactivate the controller function without requiring rebooting. The method includes: recording age of investigator equipment corresponding to a time since which the equipment has been fulfilling the role of controller, broadcasting discovery request, determining that responding equipment is fulfilling role of controller according to information representing role of controller present in response from the responding equipment, when the controller function of the investigator equipment is active, obtaining the age of the responding equipment, and deactivating the controller function of the investigator equipment if the age of the investigator equipment is less than the age of the responding equipment.

10 Claims, 8 Drawing Sheets

METHOD FOR MANAGING A CONTROLLER FUNCTION BY AN ITEM OF EQUIPMENT IN A BACKHAUL NETWORK

TECHNICAL FIELD

The present invention relates to the field of backhaul networks used for making available a unified wireless network and relates more particularly to a method for managing a controller function implemented by an item of equipment in a backhaul network. The present invention also relates to an item of equipment implementing said management method.

PRIOR ART

A wireless network can be extended geographically by means of the use of several items of equipment or access points interconnected with each other by a backhaul network and transmitting a unified wireless network.

Management of such a backhaul network is defined by the EasyMesh standard of the Wi-Fi Alliance. According to the EasyMesh standard, at least one item of equipment of the backhaul network comprises a controller function. When the controller function of said equipment is active, the equipment fulfils a role of controller within the backhaul network and is then responsible for managing the backhaul network. Equipment that does not fulfil the role of controller, for example equipment the controller function of which is inactive or equipment not comprising the controller function, then fulfils a role of agent. Equipment fulfilling the role of controller may furthermore simultaneously fulfil the role of agent.

Furthermore, according to the EasyMesh standard, only one item of equipment of the backhaul network is, at a given moment, supposed to fulfil the role of controller, in order to avoid management conflicts.

However, when a plurality of items of equipment comprise the controller function and are therefore capable of fulfilling the role of controller, the EasyMesh standard does not define a method for selecting one from said items of equipment to actually fulfil the role of controller.

A first solution consists in configuring each item of equipment comprising the controller function so that the equipment starts while fulfilling the role of agent. An election method is next implemented by means of an action of a user for selecting the equipment fulfilling the role of controller. Such an action has recourse for example to a connection of an Ethernet cable or to a manual configuration. However, such an election method is dependent on the action of the user.

Moreover, such an election method is based on the use of predefined selection criteria. The use of such criteria may, when the configuration of the backhaul network changes, result in an item of equipment initially fulfilling the role of controller being replaced by another item of equipment in the backhaul network for fulfilling the role of controller whereas the equipment initially fulfilling the role of controller remains in the backhaul network.

It is therefore desirable to overcome these drawbacks of the prior art.

It is in particular desirable to provide a solution that makes it possible to select a single item of equipment fulfilling the role of controller in the backhaul network without having recourse to an action by a user. It is furthermore desirable to provide a solution that makes it possible to dynamically select an item of equipment fulfilling the role of controller, in other words whenever the configuration of the backhaul network changes. It is also desirable to favour an item of equipment fulfilling the role of controller keeping said role of controller when a change in the configuration of the backhaul network occurs. Finally, it is desirable to provide a solution compatible with the EasyMesh standard and which allows interoperability with any equipment in the backhaul network.

DISCLOSURE OF THE INVENTION

One object of the present invention is to propose a method for managing a controller function of an item of investigator equipment, said investigator equipment belonging to a backhaul network, the backhaul network comprising a plurality of items of equipment, each item of equipment in the backhaul network being capable of managing a wireless network so that the backhaul network makes available a unified wireless network. At least one item of equipment of the backhaul network comprises a controller function, and each item of equipment comprising the controller function fulfils a role of controller involving managing the backhaul network when the controller function of said equipment is active. The investigator equipment is provided with a dynamic control service, each item of equipment provided with the dynamic control service comprising the controller function and comprising the ability to activate and deactivate the controller function without requiring rebooting. The method is implemented by the investigator equipment and comprises the steps of recording an age of the investigator equipment, the age of an item of equipment being a time, determined at a given instant, since which said item of equipment has fulfilled the role of controller, broadcasting, as soon as an age of the investigator equipment is recorded, an initial discovery request intended to identify any equipment in the backhaul network fulfilling the role of controller, determining, for each response to the initial discovery request received coming from an item of equipment, referred to as responding equipment, that the responding equipment fulfils the role of controller according to information representing the role of controller present in the response received.

The method furthermore comprises, when the controller function of the investigator equipment is active at the instant of broadcasting the initial discovery request, the steps of:

obtaining, in the response received, the age of the responding equipment, and deactivating the controller function of the investigator equipment if the age of the investigator equipment is less than the age of the responding equipment.

Thus the management method makes it possible to select a single item of equipment fulfilling the role of controller when a management conflict resulting from two items of equipment fulfilling the role of controller arises. The management method does not require any external action such as the intervention of a user.

Furthermore, the management method favours the keeping of the role of controller by the equipment that fulfils said role of controller with the greatest seniority. The management method thus limits the presence of disturbances in the organisation of the backhaul network when there is a change in configuration.

According to a particular embodiment, the initial discovery request is furthermore intended to identify any equipment in the backhaul network provided with the dynamic control service. The method furthermore comprises:

determining, for each response to the initial discovery request received coming from responding equipment, that the responding equipment is provided with the dynamic control service according to information representing the dynamic control service present in the response received, deactivating the controller function of the investigator equipment if the responding equipment fulfils the role of controller and lacks the dynamic control service, when the controller function of the investigator equipment is active at the instant of broadcasting of the initial discovery request. Furthermore, the step of obtaining, in the response received, the age of the responding equipment, is performed if the responding equipment fulfilling the role of controller is furthermore provided with the dynamic control service.

Thus the interoperability of the management method with equipment with no dynamic control service and therefore not implementing said management method, is guaranteed.

According to a particular embodiment, the method furthermore comprises sending, in the backhaul network, a configuration change message when the investigator equipment deactivates the controller function, the configuration change message comprising an identifier of the responding equipment fulfilling the role of controller so that each other item of equipment can send to said responding equipment a configuration renewal request.

Thus it is easy for each item of equipment in the backhaul network to obtain a new configuration when the investigator equipment deactivates its controller function.

According to a particular embodiment, the method furthermore comprises, when the controller function of the investigator equipment is inactive at the instant of broadcasting of the initial discovery request:

broadcasting an additional discovery request identical to the initial discovery request when no response received during a first predefined period following the broadcasting of the previous discovery request makes it possible to identify another item of equipment of the backhaul network fulfilling the role of controller, activating the controller function of said equipment when the number of additional discovery requests sent reaches a predetermined threshold and if no response received during the first predefined period following the broadcasting of the previous discovery request makes it possible to identify another item of equipment of the backhaul network fulfilling the role of controller.

Thus the management method makes it possible to select equipment fulfilling the role of controller when a change in the configuration of the backhaul network causes the absence of equipment fulfilling said role of controller.

According to a particular embodiment, the method furthermore comprises, when the controller function of the investigator equipment is inactive at the instant of broadcasting of the initial discovery request:

broadcasting an additional discovery request identical to the initial discovery request when no response received during a first predefined period following the broadcasting of the previous discovery request makes it possible to identify another item of equipment of the backhaul network fulfilling the role of controller, activating the controller function of said equipment when no response received makes it possible to identify another item of equipment of the backhaul network fulfilling the role of controller, and if a second predefined period counted as from the broadcasting of the initial discovery request has elapsed (314), the second predefined period being greater than the first predefined period.

According to a particular embodiment, the method furthermore comprises recording a new age of the investigator equipment and broadcasting a new initial discovery request when the first predefined period counted as from the broadcasting of the previous initial discovery request has elapsed.

Thus the investigator equipment checks at regular intervals that the role of controller C is fulfilled by a single item of equipment in the backhaul network and can activate and deactivate its controller function dynamically, in other words by taking into account the change over time in the configuration of the backhaul network.

According to a particular embodiment, each step of activating or deactivating the controller function is performed if no activation or deactivation of the controller function of the investigator equipment has been implemented since the broadcasting of the previous initial request. The invention also relates to investigator equipment belonging to a backhaul network, the backhaul network comprising a plurality of items of equipment, each item of equipment in the backhaul network being capable of managing a wireless network so that the backhaul network makes available a unified wireless network. At least one item of equipment of the backhaul network comprising the controller function, each item of equipment comprising the controller function fulfils a role of controller involving managing the backhaul network when the controller function of said equipment is active. The investigator equipment is provided with a dynamic control service, each item of equipment provided with the dynamic control service comprising the controller function and comprising the ability to activate and deactivate the controller function without needing rebooting. The investigator equipment comprises:

means for recording an age of the investigator equipment, the age of an item of equipment being a period, determined at a given instant, since which said item of equipment has fulfilled the role of controller, means for broadcasting, as soon as an age of the investigator equipment is recorded, an initial discovery request intended to identify any equipment in the backhaul network fulfilling the role of controller, means for determining, for each response to the initial discovery request received coining from an item of equipment, referred to as responding equipment, that the responding equipment fulfils the role of controller according to information representing the role of controller present in the response received, and the investigator equipment furthermore comprises:

means for obtaining, in the response received, the age of the responding equipment when the controller function of the investigator equipment is active at the instant of the broadcasting of the initial discovery request, and means for deactivating the controller function of the investigator equipment if the age of the investigator equipment is less than the age of the responding equipment.

The invention also relates to a backhaul network wherein the method mentioned above is implemented, in any one of its embodiments, by each item of equipment provided with the dynamic control service of the backhaul network.

The invention also relates to a computer program that can be stored on a medium and/or downloaded from a communication network, in order to be read by a processor. This computer program comprises instructions for implementing the method mentioned above in any one of the embodiments thereof, when said program is executed by the processor.

The invention also relates to an information storage medium storing such a computer program.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
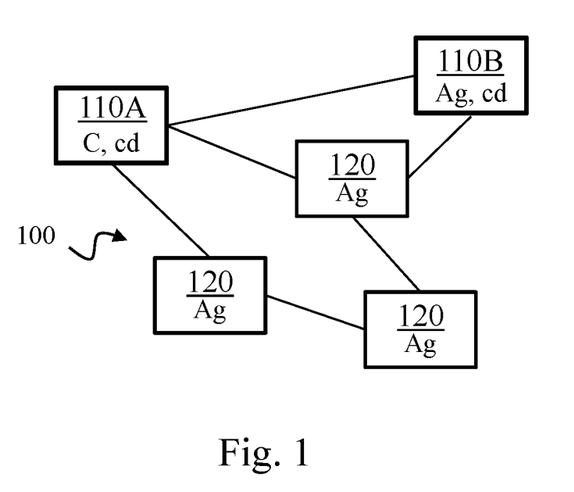
FIG. 1 illustrates schematically a backhaul network in a first configuration, comprising at least one item of equipment provided with a dynamic control service.

FIG. 1 thus illustrates schematically a backhaul network 100, in a first configuration, comprising at least one item of equipment 110A, 110B, provided with a dynamic control service cd.

Each backhaul network 100 is a communication network intended to interconnect with each other several items of equipment also referred to as access points, in order to make available a unified wireless network. Each item of equipment of said backhaul network 100 is capable of managing a wireless network having characteristics of a unified wireless network such as an identifier such as for example the SSID (standing for "Service Set IDentifier") of the unified wireless network and a password, which makes it possible for example to geographically extend the coverage of said unified wireless network.

Management of the backhaul network 100 is defined for example by the EasyMesh standard, or by other solutions for managing meshing of Wi-Fi equipment to form a unified mesh wireless network. At least one item of equipment in the backhaul network 100 comprises a controller function, said controller function being able to be active or inactive. When the controller function of an item of equipment is active, the equipment fulfils a role of controller C within the backhaul network and is then responsible for managing the backhaul network. Any equipment the controller function of which is inactive or not comprising a controller function fulfils a role of agent Ag. Equipment fulfilling the role of controller may also simultaneously fulfil the role of agent.

Furthermore, according to the EasyMesh standard, and also for the other solutions for managing a mesh wireless network, only one item of equipment of each backhaul network 100 must fulfil the role of controller C when said backhaul network is in permanent mode, in other words as long as the backhaul network 100 is not undergoing any structural modification resulting from an addition or removal of at least one item of equipment or from a modification of the role fulfilled by an item of equipment.

In the first configuration, the backhaul network 100 thus comprises the equipment 110A, which fulfils the role of controller C, and furthermore comprises the equipment 110B and equipment 120 that fulfil the role of agent Ag.

Furthermore, the items of equipment 110A and 110B are provided with a dynamic controller service. Each item of equipment 110A, 110B provided with the dynamic controller service has the ability to activate and deactivate the controller function in order to fulfil or not the role of controller C. Activating and deactivating the controller function does not require rebooting the equipment. A management component capable of activating or deactivating add-on software implementing the controller function is for example used for activating or deactivating the controller function without requiring rebooting.

Thus, in the first configuration of the backhaul network 100, the equipment 110A fulfils the role of controller C, in other words the controller function of the equipment 110A is active. On the other hand, the equipment 110B fulfils the role of agent Ag, in other words the controller function of the equipment 110B is inactive.

Figure 2:
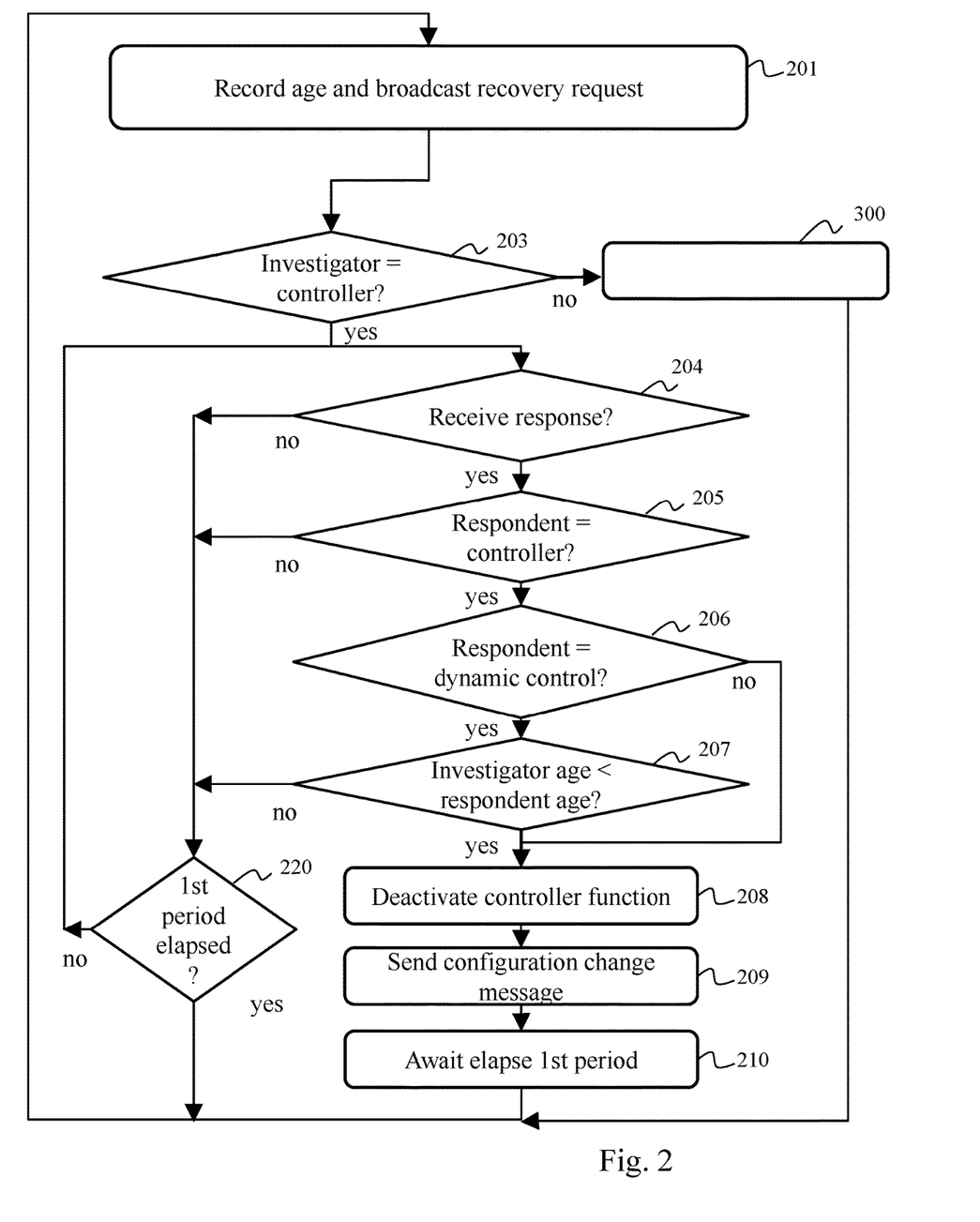
FIG. 2 illustrates schematically a method for managing a controller function of equipment provided with a dynamic control service, referred to as investigator equipment.

FIG. 2 illustrates schematically a method for managing the controller function of equipment 110A, 110B provided with the dynamic controller service, referred to as investigator equipment 110. Said management method is intended to activate and deactivate the controller function of the investigator equipment.

The management method is implemented periodically by each item of equipment 110A, 110B provided with the dynamic control service cd of a backhaul network 100. In other words, each item of investigator equipment broadcasts a discovery request at regular intervals, for example every 60 seconds, in order to identify, in the backhaul network 100, other items of equipment fulfilling the role of controller C and to decide or not to activate or deactivate its controller function. The management method aims at solving conflicts that may result from the absence of equipment fulfilling the role of controller C or from at least two items of equipment fulfilling the role of controller C in the backhaul network 100.

In a first step 201, the investigator equipment determines and records its age at the present instant. The age of equipment provided with a dynamic control service cd is a time, determined at a given instant, since which the controller function of the equipment has been active. If the controller function of equipment is inactive, the age of said equipment is zero. Furthermore, the investigator equipment broadcasts, in the backhaul network 100, an initial discovery request RQ_DECOUV intended to identify any equipment in the backhaul network 100 that fulfils the controller function and to identify any equipment in the backhaul network 100 that is provided with the dynamic control service. The initial discovery request RQ_DECOUV is sent as soon as the age of the investigator equipment is recorded.

An initial discovery request RQ_DECOUV comprises information representing the role of the controller C, indicating a search in the backhaul network 100 for any equipment fulfilling the role of controller C, and comprises information representing the dynamic control service cd, indicating a search in the backhaul network 100 for any equipment provided with the dynamic control service cd.

According to a particular embodiment, the initial discovery request RQ_DECOUV is in accordance with a message format defined by IEEE 1905.1 and comprises TLV (standing for "type-length-value") format fields. The initial discovery request RQ_DECOUV from the investigator equipment thus comprises a first TLV format field comprising the value 0x01, the value 0x01 representing the role of the controller C, and comprises a second TLV format field comprising the value 0x02, the value 0x02 representing the dynamic control service cd. Use of the standardised message format defined by IEEE 1905.1 and comprising TLV format fields thus guarantees the compatibility of the management method with the EasyMesh standard or with other solutions for managing a mesh wireless network.

In a following step 203, the investigator equipment determines whether its controller function is active at the moment of the broadcasting of the discovery request RQ_DECOUV. If such is the case, a step 204 is performed. Otherwise the investigator equipment considers that its controller function is inactive, in other words that it is fulfilling the role of agent Ag, and performs a step 300.

At the step 204, the investigator equipment determines whether a response REP to the initial discovery request RQ_DECOUV is received coming from another item of equipment, referred to as responding equipment, of the backhaul network 100. If a response REP is received, a step 205 is performed. Otherwise a step 220 is performed.

At the step 220, the investigator equipment determines whether a first predefined period has elapsed. The first predefined period is counted as from the broadcasting of the previous discovery request, which corresponds to the initial discovery request RQ_DECOUV broadcast by the investigator equipment at the previous step 201. According to one embodiment, the first predefined period is less than or equal to 60 seconds. If the first predefined period has elapsed, the investigator equipment returns to the step 201. Thus the management method is implemented by the investigator equipment at regular intervals. Otherwise the investigator equipment returns to the step 204.

At the step 205, the investigator equipment analyses the response REP in order to determine whether the responding equipment is fulfilling the role of controller C.

If the investigator equipment detects, in the response REP sent by the responding equipment, information representing the role of controller C, the investigator equipment determines that the responding equipment is fulfilling the role of controller C. This is the case for example when the response REP in accordance with the format defined by IEEE 1905.1 comprises a TLV format field comprising the value 0x00. A step 206 is then performed.

In the contrary case, if the investigator equipment does not detect in the response REP information representing the role of controller C, the investigator equipment determines that the responding equipment is not fulfilling the role of controller C. The step 220 is then performed.

At the step 206, the investigator equipment analyses the response REP in order to determine whether the responding equipment is provided with the dynamic control service ed.

If the investigator equipment detects in the response REP information representing the dynamic control service cd, such as a TLV format field comprising the value 0x02, the investigator equipment determines that the responding equipment is provided with the dynamic control service cd. A step 207 is then performed.

In the contrary case, if the investigator equipment does not detect, in the response REP, information representing the dynamic control service cd, the investigator equipment determines that the responding equipment is not provided with the dynamic control service cd. A step 208 is then performed. Interoperability of the management method with equipment lacking the dynamic control service and therefore not implementing said management method is thus guaranteed.

At the step 207, the investigator equipment obtains the age of the responding equipment in the response REP received. This is because any response REP from responding equipment comprising information representing the dynamic control service cd also comprises information representing the age of said responding equipment.

For example, in the case where the response REP of the responding equipment is in accordance with the format defined by IEEE 1905.1, the response REP then comprises a TLV format field, referred to as "age" field, comprising an identifier representing an age type and a variable representing the age of the responding equipment.

An "age" field comprises for example a first element with a size of 1 byte and with the hexadecimal value 0xDD indicating a field type specific to a supplier, a second element with a size of 1 byte and with a variable value indicating the number of bytes of following elements belonging to said TLV format field, such as for example 12 bytes, a third element with a size of 3 bytes and with the hexadecimal value 0x08-D5-9D corresponding to a unique identifier of an organisation using said TLV format field, a fourth element with a size of 1 byte and with the hexadecimal value 0x01 corresponding to an identifier representing the age type, and a fifth element with a size of 8 bytes and a variable value, said variable value representing the age of the equipment sending said TLV format field.

The investigator equipment furthermore compares its own age with the age of the responding equipment. If the age of the investigator equipment is less than the age of the responding equipment, the investigator equipment performs the step 208. Otherwise the step 220 is performed. The management method thus favours the keeping of the role of controller by the equipment that fulfils said role of controller with the greatest seniority. The management method thus limits the presence of disturbances in the organisation of the backhaul network when there is a change of configuration.

At the step 208, the investigator equipment decides to deactivate its controller function. The responding equipment is then considered to be the only item of equipment fulfilling the role of controller C in the backhaul network 100. The management method thus makes it possible to select a single item of equipment fulfilling the role of controller C in the backhaul network without requiring any external action such as the intervention of a user.

In a following step 209, the investigator equipment broadcasts in the backhaul network 100 a configuration change message CONFIG_RENEW. The configuration change message CONFIG_RENEW comprises an identifier of the responding equipment, considered to be the only item of equipment fulfilling the role of controller C, so that each other item of equipment can send to said responding equipment a configuration renewal request.

In a following step 210, the investigator equipment awaits the elapsing of the first predefined period. When the first predefined period has elapsed, the investigator equipment returns to the step 201. Thus the investigator equipment checks at regular intervals that the role of controller C is fulfilled by a single item of equipment in the backhaul network and can activate and deactivate its controller function dynamically, in other words by taking account of the change over time in the configuration of the backhaul network.

At the step 300, the investigator equipment performs a succession of steps described in FIG. 3. The investigator equipment next returns to the step 201.

Figure 3A:
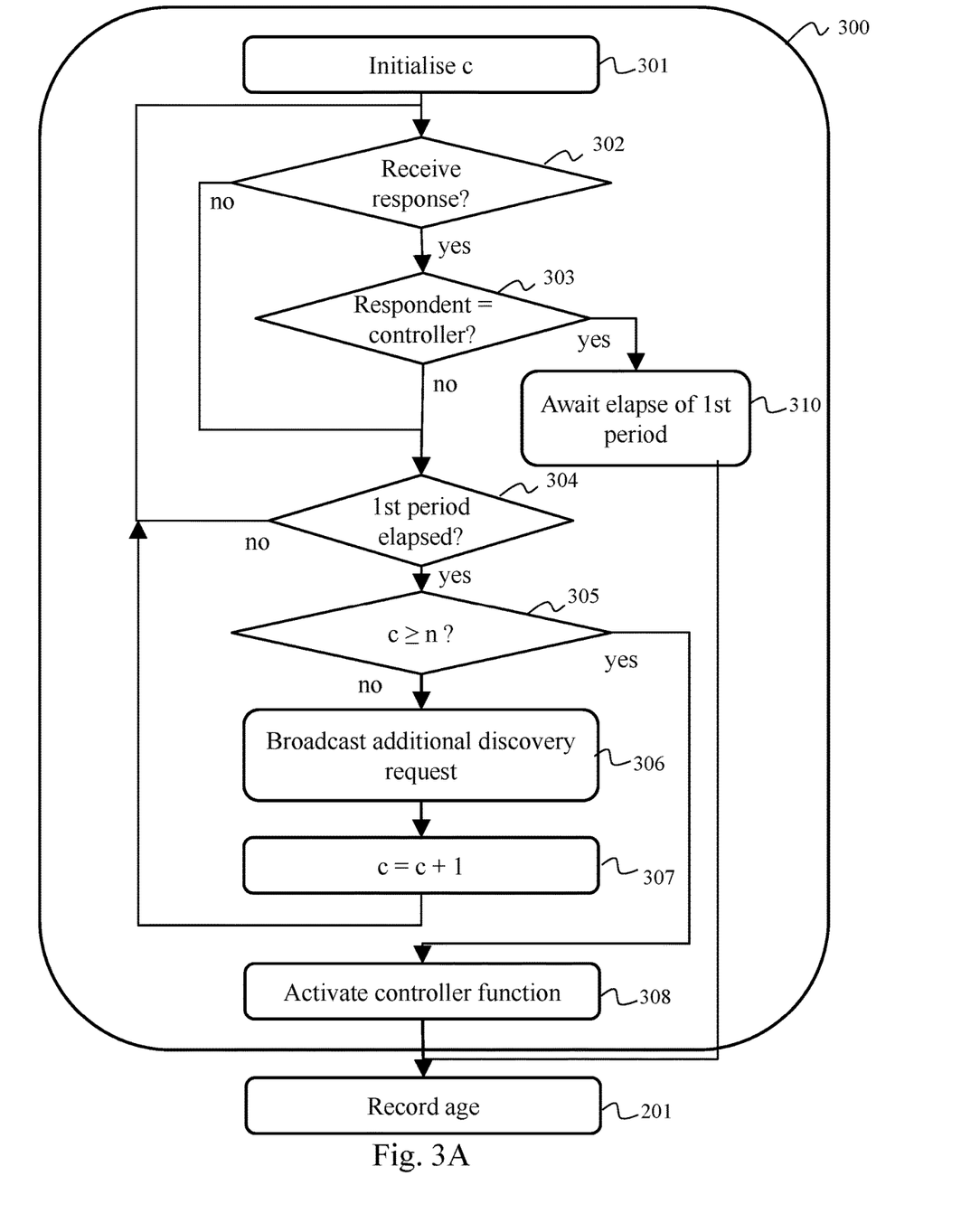
FIG. 3A illustrates schematically a step of the management method according to a first embodiment, said step being implemented when the controller function of the investigator equipment is initially inactive.

FIG. 3A illustrates schematically the step 300 of the management method according to a first embodiment. The step 300 is performed following the step 203 when the controller function of the investigator equipment is inactive at the moment of broadcasting the initial discovery request RQ_DECOUV.

In a first step 301, the investigator equipment initialises a counter c to a predefined initial value, for example c=0.

In a following step 302, the investigator equipment determines whether a response REP to the initial discovery request RQ_DECOUV or to an additional discovery request RQ_DECOUV_B is received coining from another item of equipment, referred to as responding equipment, of the backhaul network 100. If a response REP is received, a step 303 is performed. Otherwise a step 304 is performed.

At the step 303, similar to the step 205, the investigator equipment determines whether the responding equipment is fulfilling the role of controller C. If the investigator equipment detects, in the response REP sent by the responding equipment, the presence of information representing the role of controller C, such as the field comprising the value 0x00, the investigator equipment determines that the responding equipment is fulfilling the role of controller C and performs a step 310. Otherwise the step 304 is performed.

At the step 310, similar to the step 210, the investigator equipment waits until the first predefined period has elapsed. When the first predefined period has elapsed, the investigator equipment returns to the step 201.

At the step 304, the investigator equipment determines whether the first predefined period has elapsed. The first predefined period is counted as from the broadcasting of the previous discovery request. The previous discovery request corresponds to the initial discovery request RQ_DECOUV, broadcast at the step 201, as long as the counter c is equal to its initial value and corresponds to the previous additional discovery request RQ_DECOUV_B broadcast in a step 306 when the counter is different from its initial value. If the first predefined period has elapsed, a step 305 is performed. Otherwise the investigator equipment returns to the step 302.

At the following step 305, the investigator equipment determines whether the counter c reaches a predetermined threshold n. If the predetermined threshold n is reached, for example n=1, a step 308 is performed. Otherwise a step 306 is performed. According to other examples, the predetermined threshold has a value of between 1 and 10.

At the step 306, the investigator equipment broadcasts an additional discovery request RQ_DECOUV_B, identical to the initial discovery request RQ_DECOUV sent previously at the step 201.

In a following step 307, the investigator equipment increments the counter c, for example by one unit. The investigator equipment next returns to the step 302.

At the step 308, the investigator equipment considers that no other equipment present in the backhaul network 100 is fulfilling the role of controller C. The investigator equipment then decides to activate its controller function. The investigator equipment next performs the step 210 described in FIG. 2 and then returns to the step 208 described in FIG. 2.

Figure 3B:
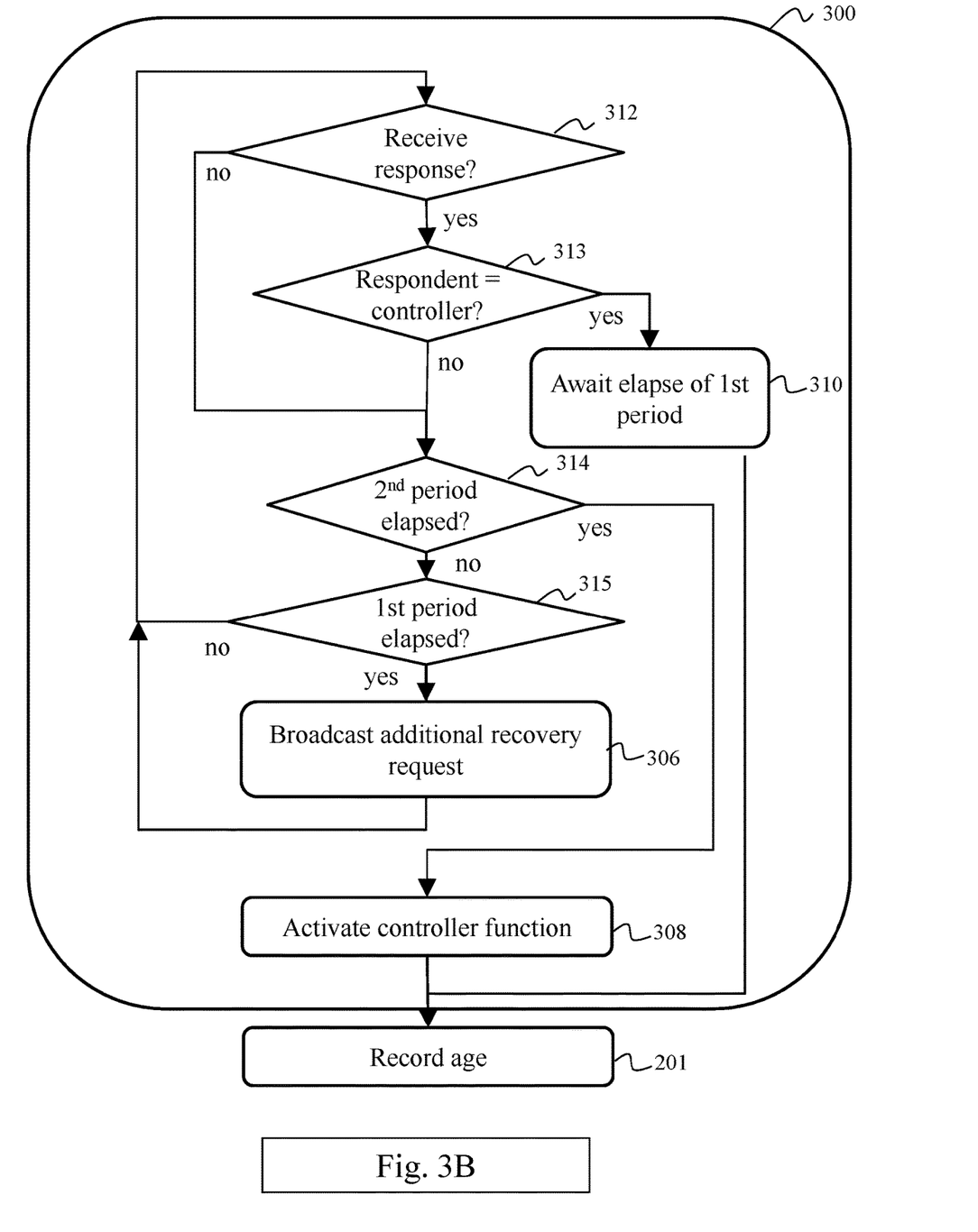
FIG. 3B illustrates schematically a step of the management method according to a second embodiment, said step being implemented when the controller function of the investigator equipment is initially inactive.

FIG. 3B illustrates schematically the step 300 of the management method according to a second example embodiment. The step 300 is performed following the step 203 when the controller function of the investigator equipment is inactive at the moment of the broadcasting of the initial discovery request RQ_DECOUV.

In a first step 312, the investigator equipment determines whether a response REP to the initial discovery request RQ_DECOUV or to an additional discovery request RQ_DECOUV_B is received coming from another item of equipment, referred to as responding equipment, in the backhaul network 100. If a response REP is received, a step 313 is performed. Otherwise a step 314 is performed.

At the step 313, similar to the step 205, the investigator equipment determines whether the responding equipment is fulfilling the role of controller C. If the investigator equipment detects, in the response REP sent by the responding equipment, the presence of information representing the role of controller C, such as the field comprising the value 0x00, the investigator equipment determines that the responding equipment is fulfilling the role of controller C and performs a step 310. Otherwise the step 304 is performed.

At the step 310, similar to the step 210, the investigator equipment waits until the first predefined period has elapsed. When the first predefined period has elapsed, the investigator equipment returns to the step 201.

At the step 314, the investigator equipment determines whether a second predefined period has elapsed. The second predefined period is counted as from the broadcasting of the initial discovery request RQ_DECOUV, sent at the previous step 201. If the second predefined period has elapsed, the step 308 is performed. Otherwise the investigator equipment performs a step 315. The second predefined period is longer than the first predefined period.

At the step 315, the investigator equipment determines whether the first predefined period, counted as from the broadcasting of the previous discovery request, has elapsed. The previous discovery request may be the initial discovery request RQ_DECOUV, sent at the step 201, or a previous additional discovery request RQ_DECOUV_B broadcast in a step 306. If the first predefined period has elapsed, the step 306 is performed. Otherwise the investigator equipment returns to the step 312.

At the step 306, the investigator equipment broadcasts an additional discovery request RQ_DECOUV_B, identical to the initial discovery request RQ_DECOUV sent previously at the step 201. The investigator equipment next returns to the step 312.

At the step 308, the investigator equipment activates its controller function. The investigator equipment next returns to the step 201 described in FIG. 2.

Figure 4:
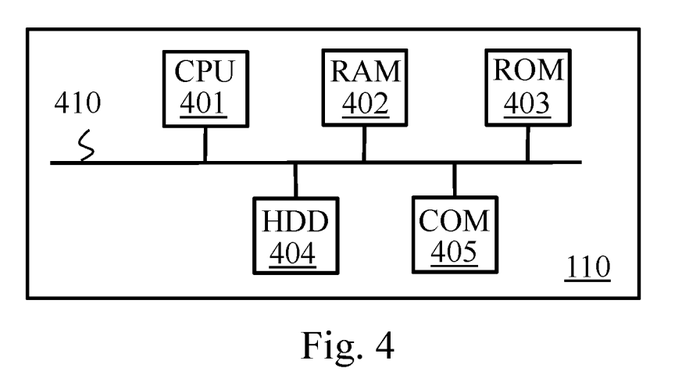
FIG. 4 illustrates schematically an example of a hardware architecture of investigator equipment of the backhaul network.

FIG. 4 illustrates schematically an example of a hardware architecture of investigator equipment 110 of the backhaul network 100.

The investigator equipment 110 then comprises, connected by a communication bus 410: a processor or CPU (central processing unit) 401; a random access memory RAM 402; a read only memory ROM 403; a storage unit or a storage medium reader, such as a hard disk HDD (hard disk drive) 404; and an interface 405 for communicating with each other item of equipment in the backhaul network 100.

The processor 401 is capable of executing instructions loaded in the RAM 402 from the ROM 403, from an external memory (not shown), from a storage medium, or from a communication network. When the investigator equipment 110 is powered up, the processor 401 is capable of reading instructions from the RAM 402 and executing them. These instructions form a computer program causing the implementation, by the processor 401, of all or some of the algorithms and steps described here in relation to the investigator equipment 110.

Thus all or some of the algorithms and steps described hereinafter in relation to the investigator equipment 110 can be implemented in software form by executing a set of instructions by a programmable machine, such as a DSP (digital signal processor) or a microcontroller, or in hardware form by a machine or a dedicated component, such as an FPGA (field-programmable gate array) or an ASIC (application-specific integrated circuit).

Figure 5A:
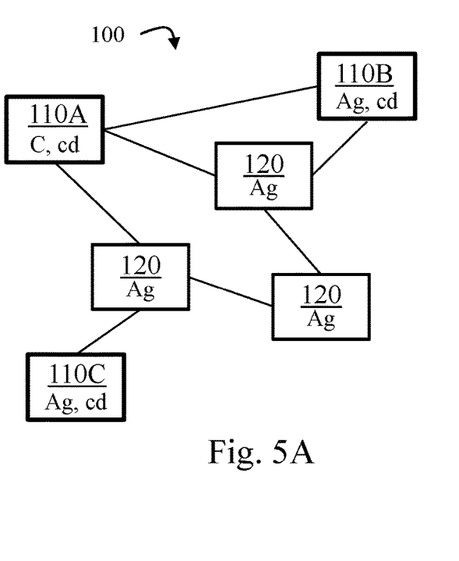
FIG. 5A illustrates schematically the backhaul network in a second configuration.

FIG. 5A illustrates schematically the backhaul network 100 in a second configuration.

The second configuration of the backhaul network 100 results from an integration, by the backhaul network 100 in the first configuration, of equipment 110C provided with the dynamic control service ed. Before it is integrated in the backhaul network 100, said equipment 110C fulfils the role of controller C, in other words the controller function of the equipment 110C is initially active.

A backhaul network 100 is in a transient mode when said backhaul net-work is undergoing a structural modification resulting from an addition or a removal of at least one item of equipment or from a modification of a function executed by an item of equipment. For example, when the backhaul network 100 changes from the first configuration to the second configuration, the backhaul network 100 is in a transient mode resulting from the addition of the equipment 110C. The backhaul network then comprises two items of equipment 110A and 110C each executing the controller function.

The implementation of the management method by each item of equipment 110A, 110B, 110C provided with the dynamic controller service makes it possible to select the single item of equipment executing the controller function at the end of the transient mode.

In the second configuration, at the end of the transient mode, the backhaul network 100 thus comprises the three items of equipment 110A, 110B and 110C, provided with the dynamic controller service. Only the equipment 110A fulfils the role of controller C. The equipment 110B keeps the role of agent Ag. The equipment 110C fulfils the role of agent Ag after having deactivated its controller function. Each item of equipment 120 fulfils the role of agent Ag.

Figure 6A:
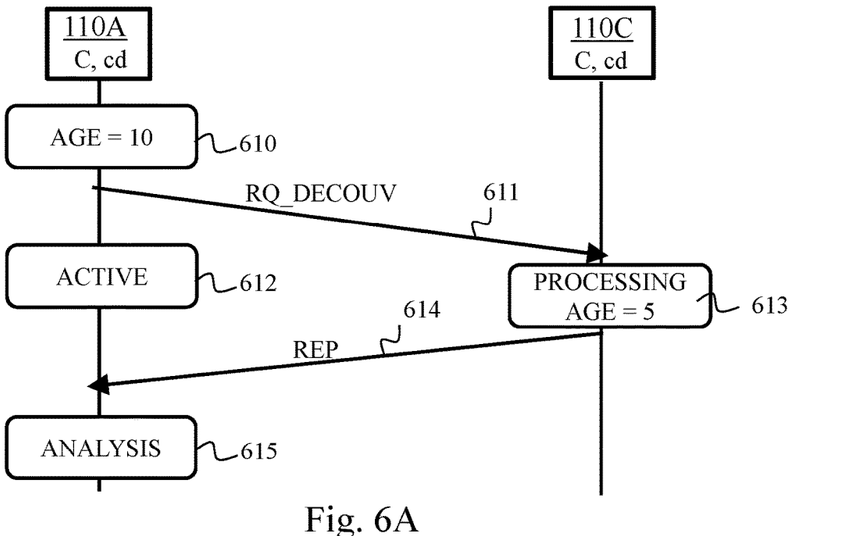
FIG. 6A illustrates schematically an exchange of messages between investigator equipment and responding equipment, according to a first example embodiment.

An example of implementation of the management method by the investigator equipment 110A during the transient mode between the first configuration and the second configuration of the backhaul network 100 is described in FIG. 6A.

Figure 6B:
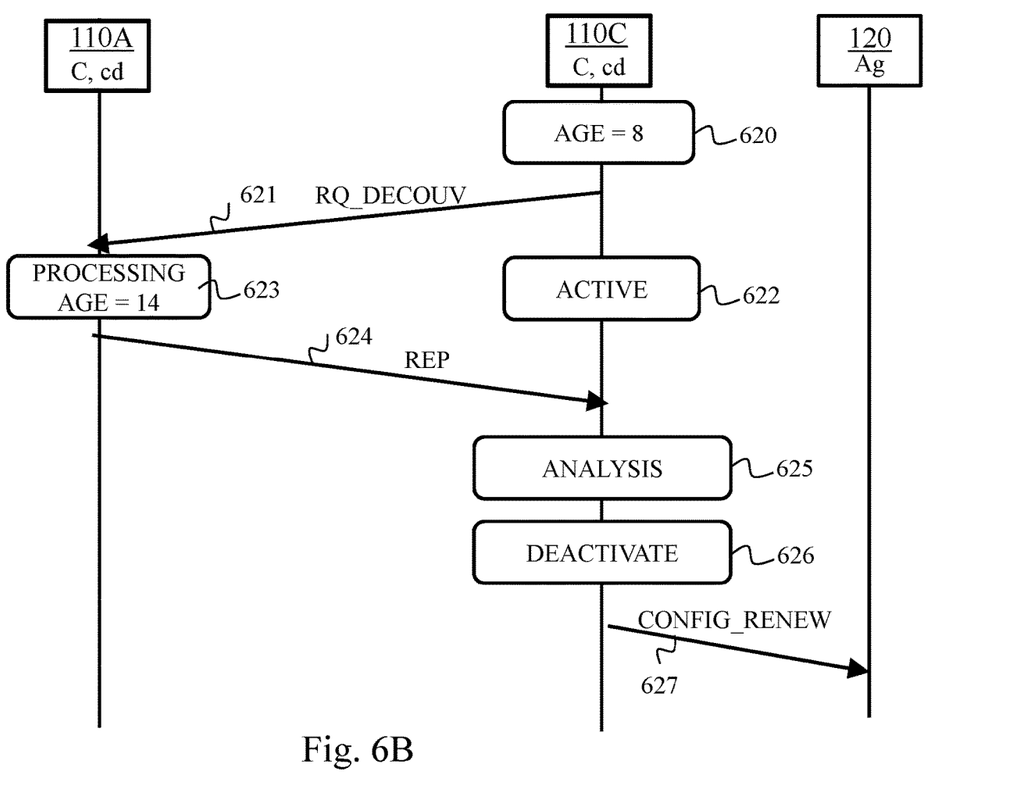
FIG. 6B illustrates schematically an exchange of messages between investigator equipment and responding equipment, according to a second example embodiment.

An example of implementation of the management method by the investigator equipment 110C during the transient mode between the first configuration and the second configuration of the backhaul network 100 is described in FIG. 6B. When the investigator equipment 110C, fulfilling the role of controller C, determines that the responding equipment 110A is also fulfilling the role of controller C and is provided with the dynamic control service cd, the investigator equipment 110C compares its own age with the age of the responding equipment 110A. The investigator equipment 110C decides to deactivate the controller function since its own age is less than the age of the responding equipment 110A.

Figure 5B:
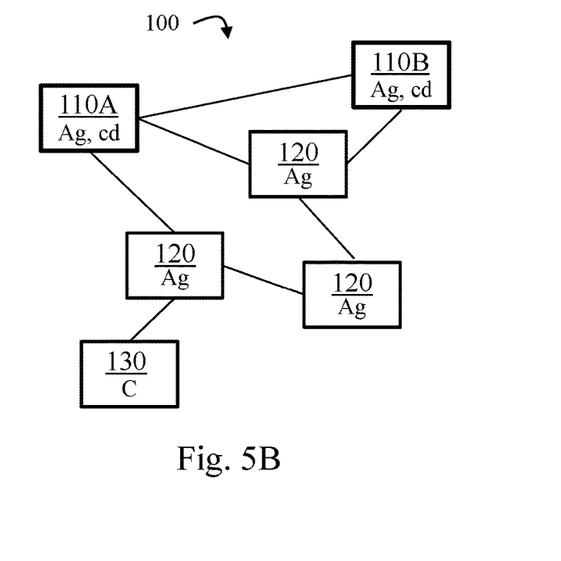
FIG. 5B illustrates schematically the backhaul network in a third configuration.

FIG. 5B illustrates schematically the backhaul network 100 in a third configuration.

The third configuration of the backhaul network 100 results from an integration, by the backhaul network 100 in the first configuration, of equipment 130 fulfilling the role of controller and lacking the dynamic control service ed.

When the backhaul network 100 changes from the first configuration to the third configuration, the backhaul network 100 is in a transient mode resulting from the addition of the equipment 130. The backhaul network 100 then compares two items of equipment 110A and 130 each fulfilling the role of controller C. Implementation of the management method by each item of equipment 110A, 110B provided with the dynamic controller service makes it possible to select the single item of equipment that is to fulfil the role of controller C at the end of the transient mode.

In the third configuration of the backhaul network 100, at the end of the transient mode, the equipment 110A fulfils the role of agent Ag after having deactivated the controller function. The equipment 110B maintains its inactive controller function and therefore continues to fulfil the role of agent Ag. The equipment 130, lacking the dynamic control service cd, keeps the role of controller C. Each item of equipment 120 fulfils the role of agent Ag.

Figure 7A:
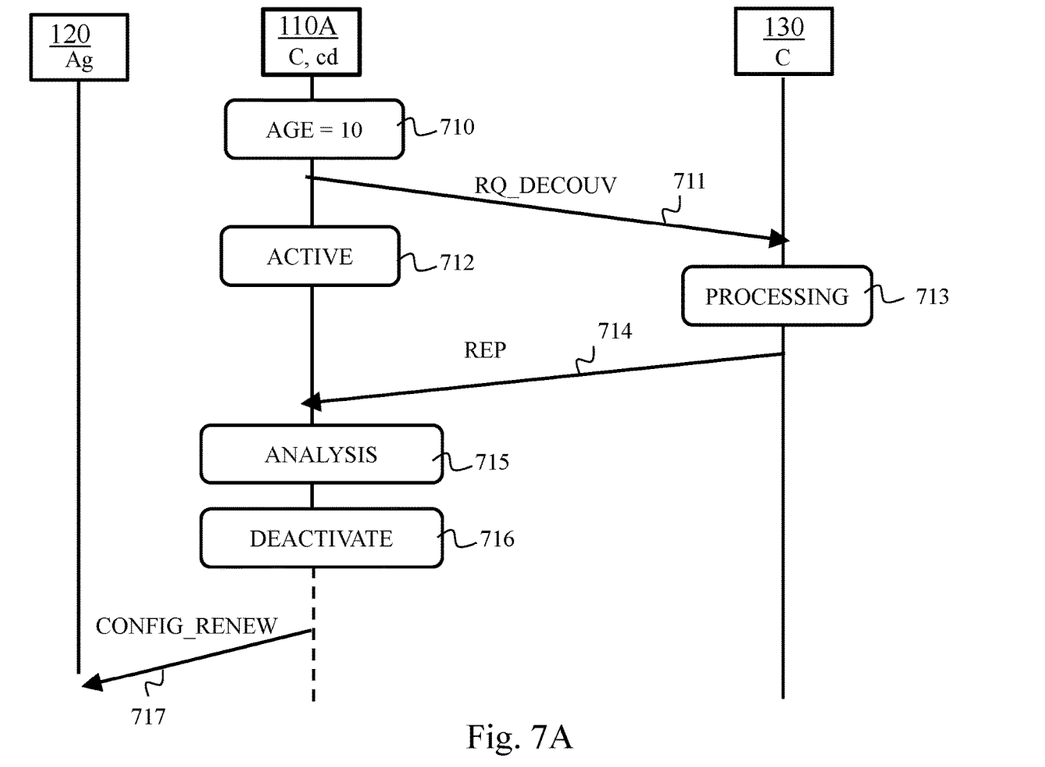
FIG. 7A illustrates schematically an exchange of messages between investigator equipment and responding equipment, according to a third example embodiment.

An example of implementation of the management method by the investigator equipment 110A during the transient mode between the first configuration and the third configuration of the backhaul network 100 is described in FIG. 7A. When the investigator equipment 110A fulfilling the role of controller C determines that the responding equipment 130 is also fulfilling the controller function and lacks the dynamic control service cd, the investigator equipment 110A decides to deactivate its controller function.

Figure 5C:
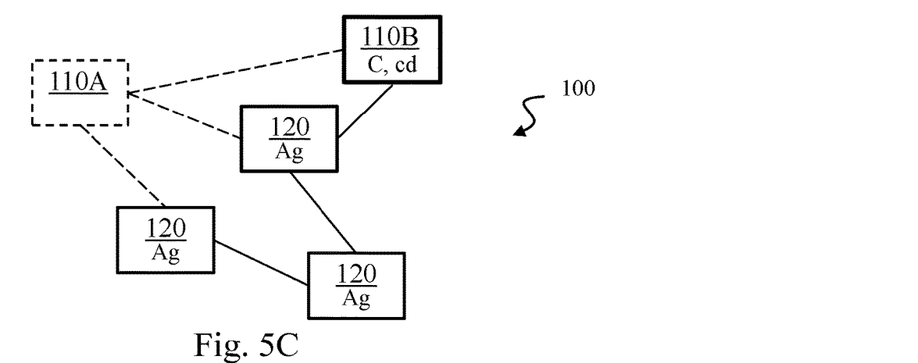
FIG. 5C illustrates schematically the backhaul network in a fourth configuration.

FIG. 5C illustrates schematically the backhaul network 100 in a fourth configuration.

The fourth configuration of the backhaul network 100 results from a removal, from the backhaul network 100 in the first configuration, of the equipment 110A provided with the dynamic controller service. The removal of the equipment 110A results for example from a switching off or a disconnection of said equipment 110A.

In the fourth configuration of the backhaul network 100, only the equipment 110B is provided with the dynamic control service cd. Each item of equipment 120 fulfils the role of agent Ag and the equipment 110B fulfils the role of controller C.

When the backhaul network 100 changes from the first configuration to the fourth configuration, the backhaul network 100 is in a transient mode resulting from the removal of the equipment 110A. The backhaul network 100 then no longer comprises any equipment fulfilling the role of controller C. The implementation of the management method by the equipment 110B provided with the dynamic controller service makes it possible to select equipment that is to fulfil the role of controller C at the end of the transient mode.

Figure 8:
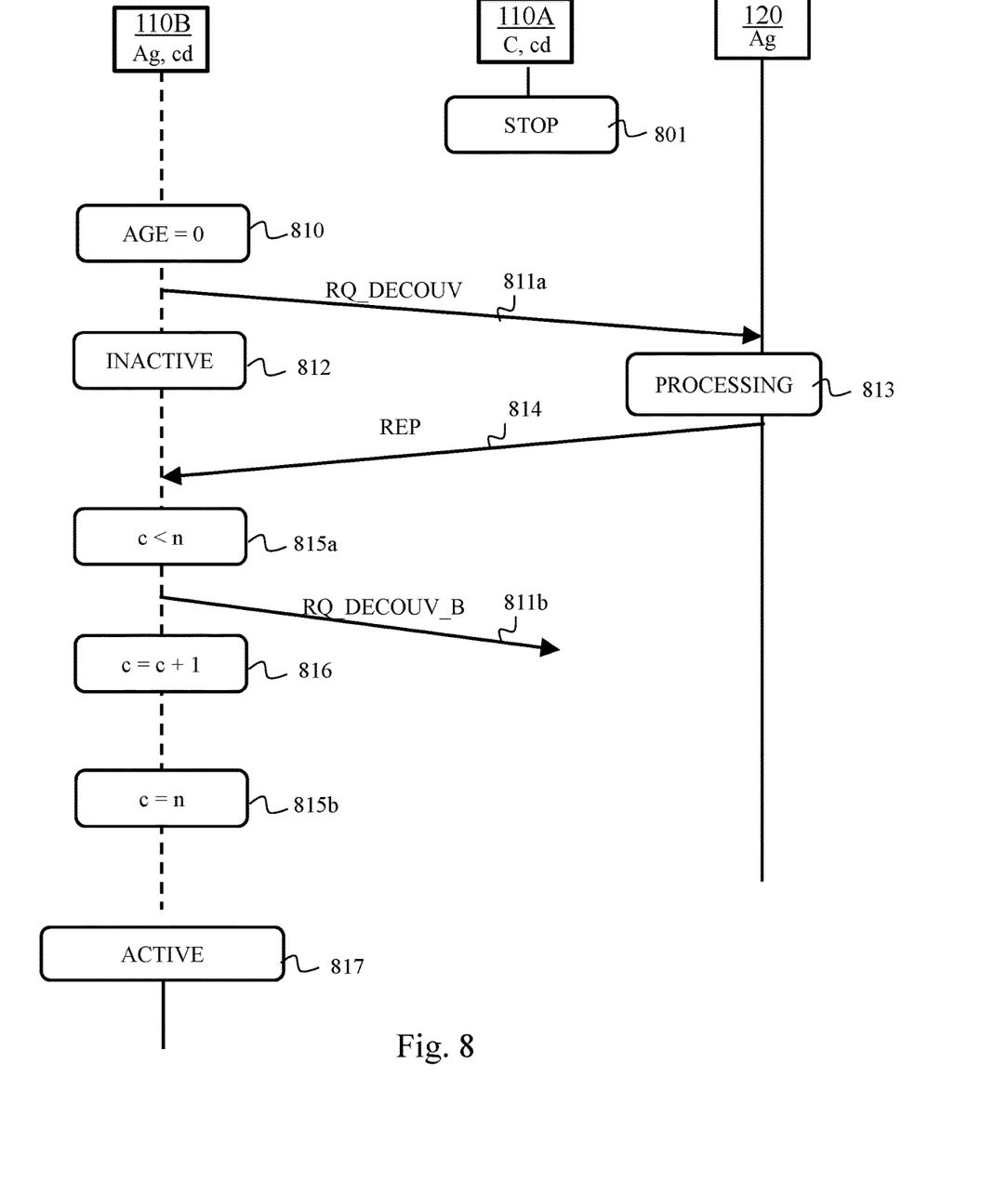
FIG. 8 illustrates schematically an exchange of messages between investigator equipment and responding equipment, according to a fifth example embodiment.

An example of implementation of the management method by the investigator equipment 110B during the transient mode between the first and fourth configuration of the backhaul network 100 is described in FIG. 8. When the investigator equipment 110B, the controller function of which is inactive, determines, after a number of discovery requests sent reaching a threshold n, that no responding equipment is fulfilling the role of controller C, the investigator equipment 110B activates its controller function.

FIG. 6A illustrates schematically an exchange of messages between the investigator equipment 110A and the responding equipment 110C of the backhaul network 100. Said exchange of messages results from the implementation of the management method by the investigator equipment 110A during the transient mode between the first configuration and the second configuration of the backhaul network 100. The investigator equipment 110A and the responding equipment 110C are both provided with the dynamic control service cd, and each, at the start of the transient mode, fulfil the role of controller C.

In a first step 610, the investigator equipment 110A records its age at the present instant. According to an example embodiment, the age of the investigator equipment is 10 seconds, in other words that makes 10 seconds that the investigator equipment has been fulfilling the role of controller C.

In a following step 611, the investigator equipment 110A broadcasts an initial discovery request RQ_DECOUV that is received by the responding equipment 110C and intended to seek any equipment fulfilling the role of controller C and any equipment provided with the dynamic control service cd.

In a following step 612, the investigator equipment 110A determines that its controller function is active at the instant of broadcasting the initial discovery request RQ_DECOUV.

In a step 613, the responding equipment 110C, fulfilling the role of controller C and provided with the dynamic control service cd, processes the initial discovery request RQ_DECOUV. The responding equipment 110C being provided with the dynamic control service cd furthermore determines its age at the instant of receiving the initial discovery request RQ_DECOUV, which is 5 seconds according to one example embodiment.

In a step 614, the responding equipment 110C sends a response REP to the investigator equipment 110A. The response REP comprises information representing the role of controller C such as the TLV format field comprising the value 0x00, information representing the dynamic control service cd such as the TLV format field comprising the value 0x02 and information representing the age of the responding equipment 110C being equal to 5 seconds.

In a following step 615, the investigator equipment 110A analyses the response REP received from the responding equipment 110C. The investigator equipment 110A thus determines that the responding equipment 110C is fulfilling the role of controller C and is provided with the dynamic control service cd. The investigator equipment 110A then obtains the age of the responding equipment II OC in the response REP and compares its own age with the age of the responding equipment 110C in accordance with the step 207 of the management method. The investigator equipment 110A determines that the age of the investigator equipment 110A, equal to 10 seconds, is greater than the age of the responding equipment 110C, equal to 5 seconds, and then keeps the role of controller C.

FIG. 6B illustrates schematically an exchange of messages between the investigator equipment 110C, the responding equipment 110A and equipment 120 in the backhaul network 100. Said exchange of messages results from an example of implementation of the management method by the investigator equipment 110C during the transient mode between the first configuration and the second configuration of the backhaul network 100.

The investigator equipment 110C and the responding equipment 110A are both provided with the dynamic control service cd and each, at the start of the transient mode, fulfil the role of controller C.

In a first step 620, the investigator equipment 110C records its age at the present instant, said age being 8 seconds according to one example embodiment.

In a following step 621, the investigator equipment 110C broadcasts an initial discovery request RQ_DECOUV that is received by the responding equipment 110A.

In a following step 622, the investigator equipment 110C determines that its controller function is active.

In a step 623, the responding equipment 110A processes the initial discovery request RQ_DECOUV. The responding equipment 110A being provided with the dynamic control service cd determines its age at the instant of reception of the initial discovery request RQ_DECOUV, said age being 14 seconds according to one example embodiment.

In a step 624, the responding equipment 110A sends a response REP to the investigator equipment 110C. The response REP comprises information representing the role of controller C such as the TLV format field comprising the value 0x00, information representing the dynamic control service cd such as the TLV format field comprising the value 0x02 and information representing the age of the responding equipment 110c equal to 14 seconds.

In a following step 625, the investigator equipment 110C analyses the response REP received from the responding equipment 110A. The investigator equipment 11C thus determines that the responding equipment 110A is fulfilling the role of controller C and is provided with the dynamic control service cd. The investigator equipment 110C then obtains the age of the responding equipment 110A in the response REP and compares its own age, equal to 8 seconds, with the age of the responding equipment 110A, equal to 14 seconds, in accordance with the step 207 of the management method. The investigator equipment 110C determines that the age of the investigator equipment 110C is less than the age of the responding equipment 110A.

In a step 626, the investigator equipment 110C deactivates the controller function in accordance with the step 208 of the management method.

In a following step 627, the investigator equipment 110C broadcasts in the backhaul network 100 a configuration change message CONFIG_RENEW comprising an identifier of the responding equipment 110A. The configuration change message CONFIG_RENEW is for example received by equipment 120 in the backhaul network 100.

FIG. 7A illustrates schematically an exchange of messages between the investigator equipment 110A, the responding equipment 130 and an item of equipment 120 in the backhaul network 100. Said exchange of messages results from an example of implementation of the management method by the investigator equipment 110A during the transient mode between the first configuration and the third configuration of the backhaul network 100.

The investigator equipment 110A and the responding equipment 130 each, at the start of the transient mode, fulfil the role of controller C. The investigator equipment 110A is provided with the dynamic control service while the responding equipment 130 lacks the dynamic control service.

In a first step 710, the investigator equipment 110A records its age at the present instant.

In a following step 711, the investigator equipment 110A broadcasts an initial discovery request that is received by the responding equipment 130 and indicates a search for any equipment implementing the controller function and any equipment provided with the dynamic control service cd.

In a following step 712, the investigator equipment 110A determines that its controller function is active at the moment that the initial discovery request RQ_DECOUV is broadcast.

In a step 713, the responding equipment 130 processes the initial discovery request RQ_DECOUV.

In a step 714, the responding equipment 130 sends a response REP to the investigator equipment 110A. The response REP comprises information representing the controller role C such as the TLV format field comprising the value 0x00. The response REP does not comprise any information representing the dynamic control service cd.

In a following step 715, the investigator equipment 110A analyses the response REP received from the responding equipment 130. The investigator equipment 110A thus determines that the responding equipment 130 is fulfilling the role of controller C and lacks the dynamic control service cd. The investigator equipment 110A then decides to deactivate its controller function in accordance with the step 207 of the management method.

In a following step 716, similar to the step 208 of the management method, the investigator equipment 110A deactivates its controller function.

In a following step 717, similar to the step 209 of the management method, the investigator equipment broadcasts in the backhaul network 100 a configuration change message CONFIG_RENEW, which is received for example by the equipment 120.

Figure 7B:
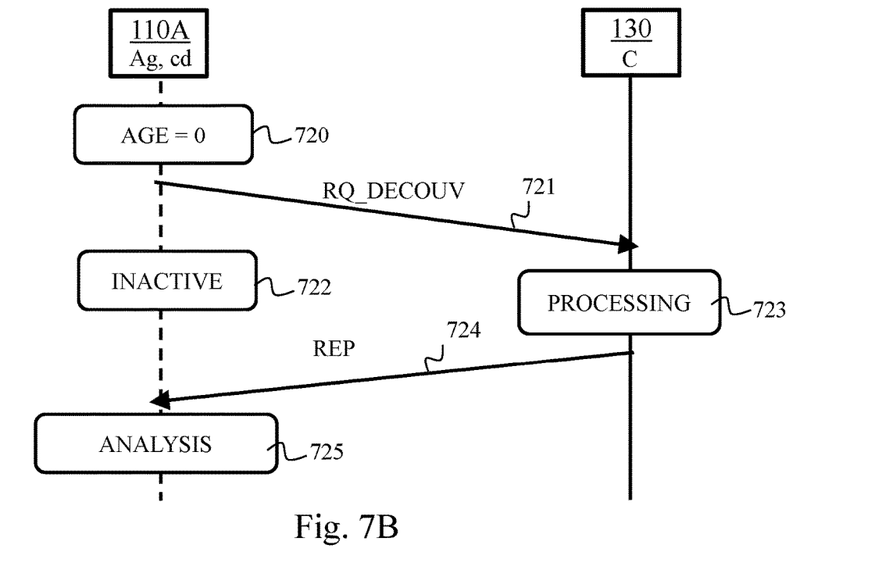
FIG. 7B illustrates schematically an exchange of messages between investigator equipment and responding equipment, according to a fourth example embodiment.

FIG. 7B illustrates schematically an exchange of messages between the investigator equipment 110A and the responding equipment 130 of the backhaul network 100. Said exchange of messages results from an example of implementation of the management method, according to a first embodiment, by the investigator equipment 110A during the permanent mode associated with the third configuration of the backhaul network 100. During said permanent mode, only the responding equipment 130 fulfils the role of controller C. The investigator equipment 110A is provided with the dynamic control service while the responding equipment 130 lacks the dynamic control service.

In a first step 720, the investigator equipment 110A records its age at the present instant. The age of the investigator equipment 110A is zero since the investigator equipment is not fulfilling the role of controller C.

In a following step 721, the investigator equipment 110A broadcasts an initial discovery request RQ_DECOUV that is received by the responding equipment 130.

In a following step 722, the investigator equipment 110A determines that its controller function is inactive at the moment of the broadcasting of the initial discovery request RQ_DECOUV. The investigator equipment 110A then initialises a counter c in accordance with the step 301 of the management method.

In a step 723, the responding equipment 130 processes the initial discovery request RQ_DECOUV.

In a step 724, the responding equipment 130 sends a response REP to the investigator equipment 110A. The response REP comprises information representing the role of controller C such as the TLV format field comprising the value 0x00. The response REP does not comprise any information representing the dynamic control service cd.

In a following step 725, the investigator equipment 110A analyses the response REP received from the responding equipment 130. The investigator equipment 110A thus determines that the responding equipment 130 is fulfilling the role of controller C. The investigator equipment 110A then decides to keep its controller function inactive and waits until the first predefined period has elapsed in accordance with the step 310 of the management method before once again implementing the steps of the management method.

FIG. 8 illustrates schematically an example of implementation of the management method according to a first embodiment by the investigator equipment 110B during the transient mode between the first configuration and the fourth configuration of the backhaul network 100. The investigator equipment 110B is provided with the dynamic control service and, at the start of the transient mode, does not fulfil the role of controller C (in other words, the investigator equipment 110B implements only the agent function Ag.

In a first step 801, the equipment 110A, which fulfils the role of controller C in the first configuration of the backhaul network 100, is removed from the backhaul network 100, for example because of switching off or disconnecting said equipment 110A.

In a step 810, the investigator equipment 110B records its age at the present instant.

In a following step 811a, the investigator equipment 110B broadcasts an initial discovery request RQ_DECOUV in the backhaul network 100. The initial discovery request RQ_DECOUV can be received by equipment 120 but cannot be received by the equipment 110A, which is switched off or disconnected from the backhaul network 100.

In a following step 812, the investigator equipment 110B determines that its controller function is inactive at the moment of the broadcasting of the initial discovery request RQ_DECOUV. The investigator equipment 110B then initialises a counter c in accordance with the step 301 of the management method, for example c=0.

In a following step 813, responding equipment 120 processes the initial discovery request RQ_DECOUV.

In a following step 814, the responding equipment 120 transmits a response REP to the investigator equipment 110B. The response REP does not comprise any information representing the role of the controller C or any information representing the dynamic control service.

In a following step 815a, the investigator equipment 110B determines that the responding equipment 120 is not fulfilling the role of controller C and furthermore considers that the second predefined period has elapsed since the broadcasting of the initial discovery request RQ_DECOUV. The investigator equipment 110B compares the counter c with the threshold n and determines that the counter c is below the threshold n, for example n=1.

In a following step 811b, the investigator equipment 110B broadcasts an additional discovery request RQ_DECOUV_B in the backhaul network 100, in accordance with the step 306 of the management method. The additional discovery request RQ_DECOUV_B cannot be received by the equipment 110A. According to one example embodiment, the additional discovery request RQ_DECOUV_B is also not received by another item of equipment in the backhaul network 100. Alternatively, the discovery request RQ_DECOUV_B could be received by equipment 120 in the backhaul network in a similar manner to the initial discovery request RQ_DECOUV at the step 811*a*.

In a following step 816, the investigator equipment 110B increments the counter c, in accordance with the step 306 of the management method, for example c=1.

In a following step 815*b*, the investigator equipment 110B, not having received a response after the second predefined period following the broadcasting of the previous additional discovery request RQ_DECOUV_B, compares the counter c with the threshold n, in accordance with the step 305 of the management method. The investigator equipment 100B determines that the counter c has reached the threshold n, for example n=1.

In a following step 817, the investigator equipment 110B then activates the controller function, in accordance with the step 308 of the management method.

The invention claimed is:

1. A method for managing a controller function of an item of investigator equipment, said investigator equipment belonging to a backhaul network, the backhaul network comprising a plurality of items of equipment, each item of equipment in the backhaul network being capable of managing a wireless network so that the backhaul network makes available a unified wireless network, at least one item of equipment of the backhaul network comprising a controller function, and each item of equipment comprising the controller function fulfils a role of controller involving managing the backhaul network when the controller function of said equipment is active, wherein the investigator equipment is provided with a dynamic control service, each item of equipment provided with the dynamic control service comprising the controller function and comprising the ability to activate and deactivate the controller function without requiring rebooting, and wherein the method causes the investigator equipment to perform:

recording an age of the investigator equipment, the age of an item of equipment being a time, determined at a given instant, since which said item of equipment has fulfilled the role of controller, broadcasting, as soon as an age of the investigator equipment is recorded, an initial discovery request intended to identify any equipment in the backhaul network fulfilling the role of controller, determining, for each response to the initial discovery request received coming from an item of equipment, referred to as responding equipment, that the responding equipment fulfils the role of controller according to information representing the role of controller present in the response received, and the method furthermore comprises, when the controller function of the investigator equipment is active at the instant of broadcasting the initial discovery request:

obtaining, in the response received, the age of the responding equipment, and deactivating the controller function of the investigator equipment if the age of the investigator equipment is less than the age of the responding equipment.

2. The method according to claim 1, wherein the initial discovery request is furthermore intended to identify any equipment in the backhaul network provided with the dynamic control service, and wherein said method causes the investigator equipment to perform:

determining, for each response to the initial discovery request received coming from responding equipment, that the responding equipment is provided with the dynamic control service according to information representing the dynamic control service present in the response received, deactivating the controller function of the investigator equipment if the responding equipment fulfils the role of controller and lacks the dynamic control service, when the controller function of the investigator equipment is active at the instant of broadcasting of the initial discovery request, and wherein obtaining, in the response received, the age of the responding equipment, is performed if the responding equipment fulfilling the role of controller is furthermore provided with the dynamic control service.

3. The method according to claim 1, wherein the method causes the investigator equipment to perform:

sending, in the backhaul network, a configuration change message when the investigator equipment deactivates the controller function, the configuration change message comprising an identifier of the responding equipment fulfilling the role of controller so that each other item of equipment can send to said responding equipment a configuration renewal request.

4. The method according to claim 1, wherein the method causes the investigator equipment to perform, when the controller function of the investigator equipment is inactive at the instant of broadcasting of the initial discovery request:

broadcasting an additional discovery request identical to the initial discovery request when no response received during a first predefined period following the broadcasting of the previous discovery request makes it possible to identify another item of equipment of the backhaul network fulfilling the role of controller, activating the controller function of said equipment when the number of additional discovery requests sent reaches a predetermined threshold and if no response received during the first predefined period following the broadcasting of the previous discovery request makes it possible to identify another item of equipment of the backhaul network fulfilling the role of controller.

5. The method according to claim 1, wherein the method causes the investigator equipment to perform, when the controller function of the investigator equipment is inactive at the instant of broadcasting of the initial discovery request:

broadcasting an additional discovery request identical to the initial discovery request when no response received during a first predefined period following the broadcasting of the previous discovery request makes it possible to identify another item of equipment of the backhaul network fulfilling the role of controller, activating the controller function of said equipment when no response received makes it possible to identify another item of equipment of the backhaul network fulfilling the role of controller, and if a second predefined period counted as from the broadcasting of the initial discovery request has elapsed, the second predefined period being greater than the first predefined period.

6. The method according to claim 1, wherein the method causes the investigator equipment to perform:

recording a new age of the investigator equipment and broadcasting a new initial discovery request when the first predefined period counted as from the broadcasting of the previous initial discovery request has elapsed.

7. The method according to claim 1, wherein activating or deactivating the controller function is performed if no activation or deactivation of the controller function of the investigator equipment has been implemented since the broadcasting of the previous initial request.

8. Investigator equipment belonging to a backhaul network, the backhaul network comprising a plurality of items of equipment, each item of equipment in the backhaul network being capable of managing a wireless network so that the backhaul network makes available a unified wireless network,
- at least one item of equipment of the backhaul network comprising the controller function, each item of equipment comprising the controller function fulfilling a role of controller involving managing the backhaul network when the controller function of said equipment is active,
- wherein the investigator equipment is provided with a dynamic control service, each item of equipment provided with the dynamic control service comprising the controller function and comprising the ability to activate and deactivate the controller function without needing rebooting, and wherein the investigator equipment comprises circuitry causing the investigator equipment to perform:
  - recording an age of the investigator equipment, the age of an item of equipment being a period, determined at a given instant, since which said item of equipment has fulfilled the role of controller,
  - broadcasting, as soon as an age of the investigator equipment is recorded, an initial discovery request intended to identify any equipment in the backhaul network fulfilling the role of controller,
  - determining, for each response to the initial discovery request received coming from an item of equipment, referred to as responding equipment, that the responding equipment fulfils the role of controller according to information representing the role of controller present in the response received, and the investigator equipment furthermore comprises:
- obtaining, in the response received, the age of the responding equipment when the controller function of the investigator equipment is active at the instant of the broadcasting of the initial discovery request, and
- deactivating the controller function of the investigator equipment if the age of the investigator equipment is less than the age of the responding equipment.

9. A backhaul network wherein the method according to claim 1 is implemented by each item of equipment provided with the dynamic control service of the backhaul network.

10. A non-transitory information storage medium that stores a computer program comprising instructions for implementing, by a processor, the method according to claim 1, when said program is executed by said processor.

* * * * *